United States Patent
Monahan et al.

(10) Patent No.: US 10,686,589 B2
(45) Date of Patent: Jun. 16, 2020

(54) COMBINING HASHES OF DATA BLOCKS

(71) Applicant: HEWLETT PACKARD ENTERPRISE DEVELOPMENT LP, Houston, TX (US)

(72) Inventors: Brian Quentin Monahan, Bristol (GB); Liqun Chen, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 110 days.

(21) Appl. No.: 15/756,055

(22) PCT Filed: Dec. 4, 2015

(86) PCT No.: PCT/US2015/063945
§ 371 (c)(1),
(2) Date: Feb. 27, 2018

(87) PCT Pub. No.: WO2017/095435
PCT Pub. Date: Jun. 8, 2017

(65) Prior Publication Data
US 2018/0254888 A1      Sep. 6, 2018

(51) Int. Cl.
| | |
|---|---|
| *H04L 29/06* | (2006.01) |
| *H04L 9/06* | (2006.01) |
| *G06F 16/90* | (2019.01) |
| *G06F 16/901* | (2019.01) |
| *G06F 17/16* | (2006.01) |

(52) U.S. Cl.
CPC ............ *H04L 9/0643* (2013.01); *G06F 16/90* (2019.01); *G06F 16/9014* (2019.01); *G06F 17/16* (2013.01); *H04L 2209/30* (2013.01)

(58) Field of Classification Search
USPC ........................................... 380/28
See application file for complete search history.

(56) References Cited

U.S. PATENT DOCUMENTS

| | | | |
|---|---|---|---|
| 6,742,028 B1 * | 5/2004 | Wang ................... | H04L 67/104 709/223 |
| 8,176,338 B1 | 5/2012 | Stringham | |
| 8,533,483 B2 | 9/2013 | Izu et al. | |
| 8,621,240 B1 * | 12/2013 | Auchmoody ....... | G06F 21/6272 707/640 |

(Continued)

FOREIGN PATENT DOCUMENTS

EP        1944907 A1      7/2008

OTHER PUBLICATIONS

International Search Report and Written Opinion, International Application No. PCT/US2015/063945, dated Sep. 2, 2016, pp. 1-11, KIPO.

(Continued)

*Primary Examiner* — Kambiz Zand
*Assistant Examiner* — Mohammad S Shams
(74) *Attorney, Agent, or Firm* — Hewlett Packard Enterprise Patent Department (57) ABSTRACT

Example embodiments relate to combining hashes of data blocks. The examples disclosed herein calculate a hash value for each data block in a sequence of data blocks. The hash values are combined into a combined value, where the combined value has the same sequence as the sequence of data blocks. A master hash value is then calculated for the combined value.

22 Claims, 9 Drawing Sheets

(56) References Cited

U.S. PATENT DOCUMENTS

| | | | |
|---|---|---|---|
| 8,862,886 B2 | 10/2014 | Owlett et al. | |
| 10,353,768 B2* | 7/2019 | Watanabe | G06F 16/2455 |
| 2004/0107346 A1* | 6/2004 | Goodrich | H04L 9/3236 |
| | | | 713/176 |
| 2005/0210260 A1 | 9/2005 | Venkatesan et al. | |
| 2006/0034457 A1* | 2/2006 | Damgaard | H04L 9/0861 |
| | | | 380/44 |
| 2007/0100854 A1 | 5/2007 | Lain et al. | |
| 2008/0016353 A1* | 1/2008 | Carro | G06F 21/64 |
| | | | 713/171 |
| 2010/0043057 A1* | 2/2010 | Di Battista | G06F 16/284 |
| | | | 726/2 |
| 2010/0111292 A1 | 5/2010 | Betouin et al. | |
| 2010/0114832 A1 | 5/2010 | Lillibridge et al. | |
| 2011/0283085 A1* | 11/2011 | Dilger | G06F 11/1004 |
| | | | 711/216 |
| 2012/0143830 A1* | 6/2012 | Cormode | G06F 16/24568 |
| | | | 707/687 |
| 2013/0262421 A1* | 10/2013 | Ferguson | H04L 9/0643 |
| | | | 707/698 |
| 2014/0019693 A1 | 1/2014 | Gulley et al. | |
| 2015/0058595 A1 | 2/2015 | Gura et al. | |
| 2015/0098563 A1 | 4/2015 | Gulley et al. | |
| 2016/0378752 A1* | 12/2016 | Anderson | G06F 16/2255 |
| | | | 707/747 |
| 2017/0295195 A1* | 10/2017 | Wettstein | H04L 9/0897 |

OTHER PUBLICATIONS

Richa Purohit Arya et al., "Integration of Encryption and Hash Function for Improved Message Authenticity," International Journal of Engineering Research and Applications, Sep.-Oct. 2012, pp. 2137-2142, vol. 2, Issue 5.

Extended European Search Report, EP Application No. 15909949.8, dated Oct. 12, 2018, pp. 1-11, EPO.

Wikipedia, "Cryptographic Hash Function", available online at <https://en.wikipedia.org/w/index.php?title=Cryptographic_hash_function&oldid=688820697>, retrieved on Nov. 3, 2015, 11 pages.

Wikipedia, "Fermat Polygonal Number Theorem", available online at <https://en.wikipedia.org/w/index.php?title=Fermat_polygonal_number_theorem&oldid=672388230>, retrieved on Jul. 21, 2015, 2 pages.

Wikipedia, "Merkle Tree", available online at <https://en.wikipedia.org/w/index.php?title=Merkle_tree&oldid=691347333>, retrieved on Nov. 19, 2015, 5 pages.

* cited by examiner

COMBINING HASHES OF DATA BLOCKS

BACKGROUND

A hash function is one that can map data of arbitrary size to data of fixed size. Hash tables are data structures widely used in computing for rapid data lookup. Secure hash functions allows easy verification that input data maps to a given hash value, but deliberately creates difficulty in reconstructing the input data from the hash value.

BRIEF DESCRIPTION OF THE DRAWINGS

The following detailed description references the drawings, wherein.

DETAILED DESCRIPTION

The amount of data that is generated, stored, calculated, and transmitted through computers and computing networks have explosively grown with the rapid expansion in the use of computers to host business applications, websites, cloud, etc. As more data is communicated, data protection has also increased in importance. An important issue in securely processing bulk data is the secure hashing of sequences of data blocks by cryptographic hash functions. This process arises in both data messaging and in standard data processing to check data integrity and freedom from illicit data modification or data corruption. Cryptographic hash functions have many applications, notably in digital signatures, message authentication, and other forms of authentication.

Standard approaches for constructing secure hashes may require that all the data blocks of a sequence of data blocks be present to both construct the hash and to check it again at some later time. This process may begin by hashing the first block with default initialisation and passing that hash value as the starting point for hashing the second data block and so on, until the final data block is reached and the resulting hash can be produced. Thus, the hash of the final data block is dependent upon the hashes of all prior blocks taken in the correct sequence and is typically taken as the resulting hash for the complete sequence.

However, this can result in significant cost since the data blocks typically have still to be accessible together in the correct order in order to compute the overall secure hash for the complete sequence. Furthermore, existing techniques such as Merkle hash trees involve hashing individual data blocks but then utilize rigid ways to combine them.

Examples disclosed herein address these technical challenges by providing secure partial hashing, where the structural form of the hash obtained is advantageously constructed in a flexible manner and supports associativity of combination. For example, a computing device may calculate a hash value for each data block in a sequence of data blocks. The hash values may be combined into a combined value that retains the same sequence as the sequence of data blocks. Then, a master hash value may be calculated for the combined value. The function for combining the hash values may be both associative and non-commutative. In this manner, examples herein may produce overall output hash values that satisfy several criteria, including pre-image resistance, second pre-image resistance, and collision resistance.

Figure 1:
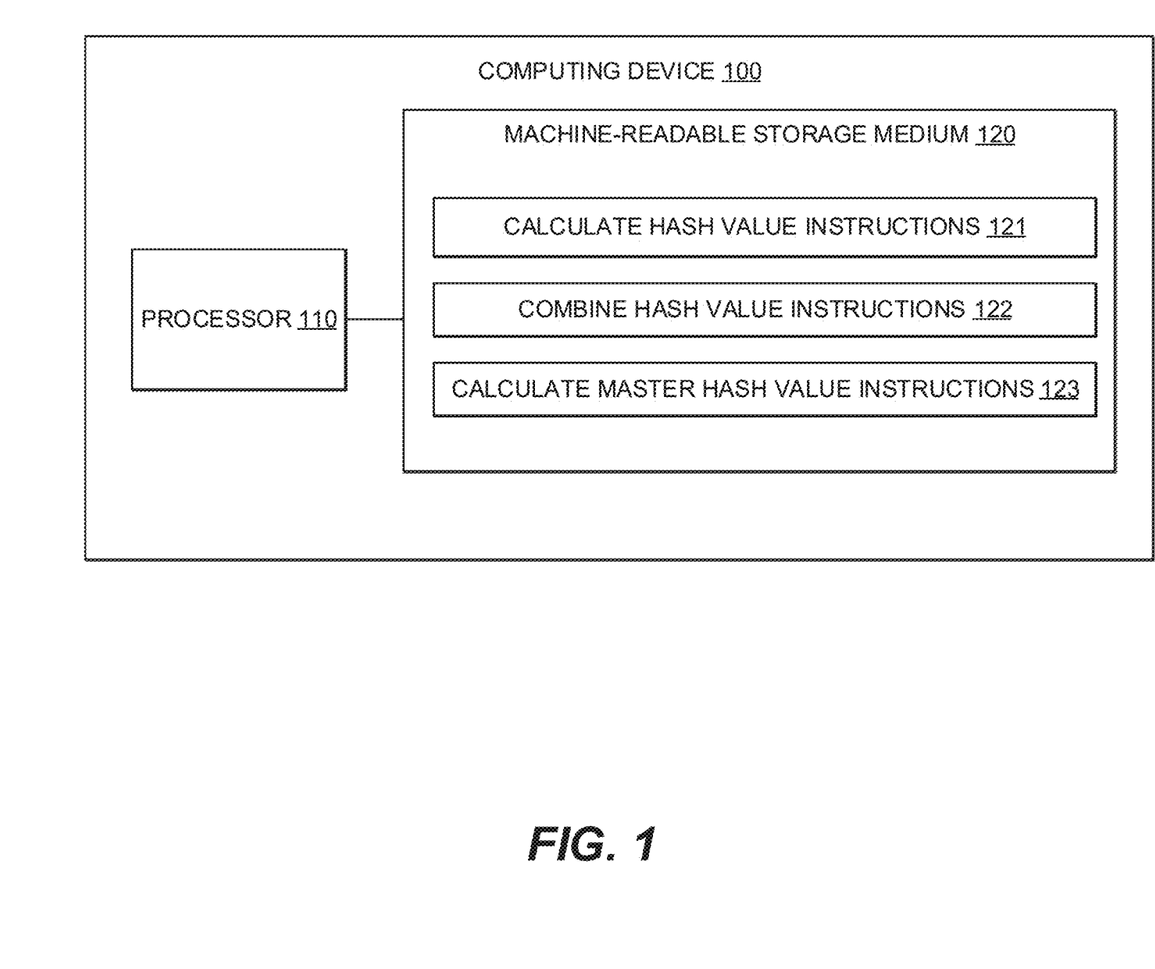
FIG. 1 is a block diagram of an example computing device for combining hashes of data blocks.

Referring now to the drawings, FIG. 1 depicts an example computing device 100 for combining hashes of data blocks. Computing device 100 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. In the example shown in FIG. 1, computing device 100 includes a processor 110 and a non-transitory machine-readable storage medium 120 encoded with instructions to combine hash values.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 121, 122, 123, and/or other instructions to implement the procedures described herein. As an alternative or in addition to retrieving and executing instructions, processor 110 may include one or more electronic circuits that include electronic components for performing the functionality of one or more of instructions 121, 122, and 123.

In one example, the program instructions 121, 122, 123, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on computing device 100.

Machine-readable storage medium 120 may be any electronic, magnetic, optical, or other physical storage device that contains or stores executable data accessible to computing device 100. Thus, machine-readable storage medium 120 may be, for example, a Random Access Memory (RAM), an Electrically Erasable Programmable Read-Only Memory (EEPROM), a storage device, an optical disc, and the like. Storage medium 120 may be a non-transitory storage medium, where the term "non-transitory" does not encompass transitory propagating signals. Storage medium 120 may be located in computing device 100 and/or in another device in communication with computing device 100. As described in detail below, machine-readable storage medium 120 may be encoded with receive calculate hash value instructions 121, combine hash value instructions 122, and calculate master hash value instructions 123.

Calculate hash value instructions 121, when executed by processor 110, may calculate a hash value for each data block in a sequence of data blocks. The operation of computing device 100 may be illustrated in FIG. 4A, which will be correlatively described with FIG. 1. For example, some bulk data may be composed of or broken down to a sequence of data blocks, such as data blocks 411 to 419. Each data block may be of a particular size. In some examples, each data block may be of the same size. For example, each block may be four to 64 kilobytes. In other examples, data blocks may not be of the same size and/or data blocks may be outside of the aforementioned size range.

Figure 4A:
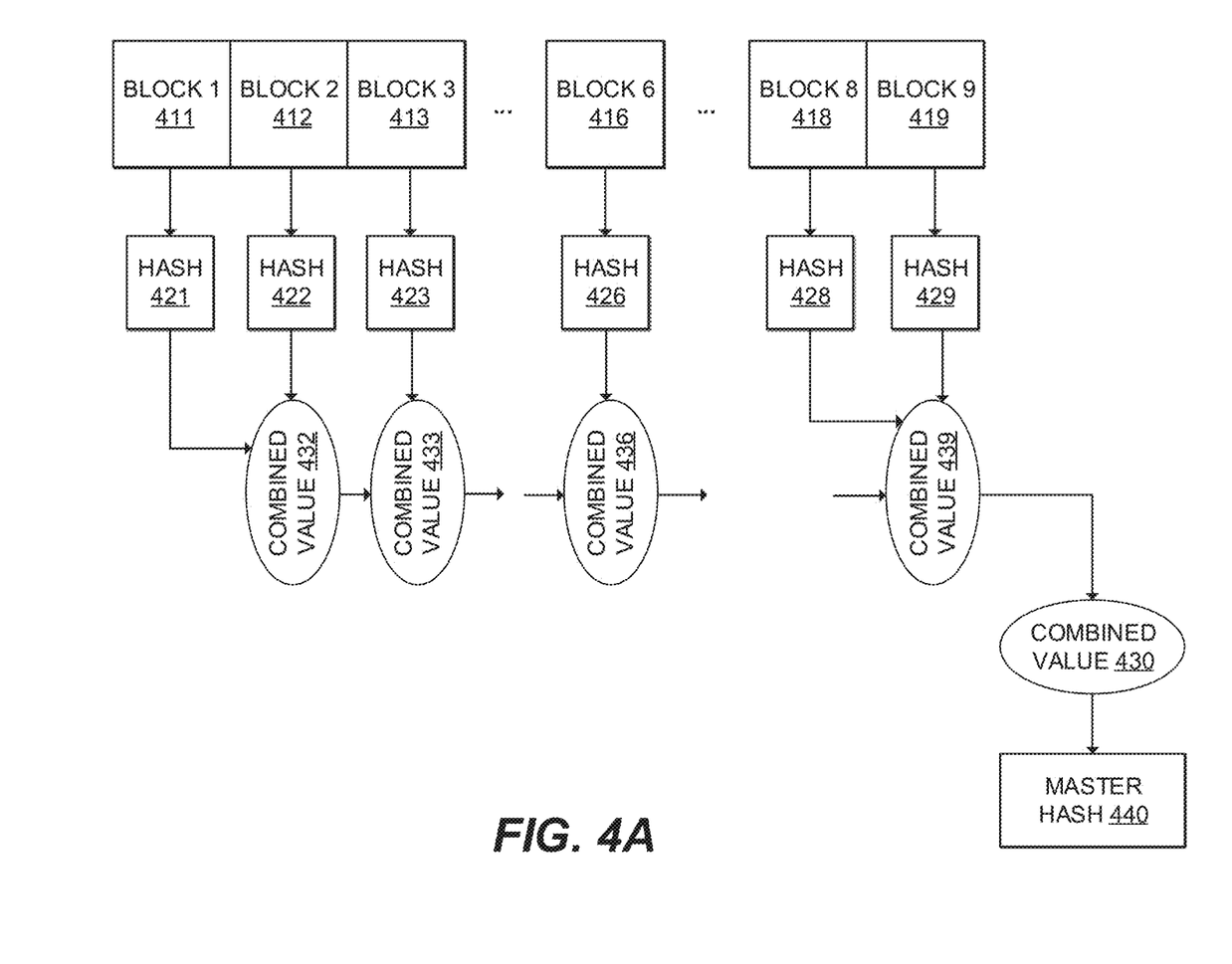
FIG. 4A is a schematic flowchart of an example hashing process.

A hash value may be calculated for each data block. For example, a hash value 421 is calculated for data block 411, a hash value 422 is calculated for data block 412, and so on. A hash value may be a value returned by a hash function, which may be any function that can be used to map data of arbitrary size to data of fixed size. For example a hash function may be performed on data block 411 to obtain hash value 421. Various types and forms of hashing functions may be utilized in examples herein.

In some examples, hash values 421-429 may be calculated from data blocks 411-419, respectively, by the operation of a cryptographic hash function. Cryptographic hash functions may be hash functions that are practically impossible to invert, that is, to recreate the input data from its hash value alone. Various cryptographic functions may be employed in the examples herein. Non-limiting examples include SHA-2 and SHA-3.

Cryptographic hash functions may be able to withstand cryptanalytic attack. A cryptographic hash function may have several properties, including pre-image resistance, second pre-image resistance, and collision resistance. Specifically, pre-image resistance refers to resistance against the finding of a message from a given hash value. Accordingly, a cryptographic hash function may related to a one-way function. Second pre-image resistance refers to resistance against finding a second message that would produce the same hash value as a first message. Collision resistance refers to resistance against cryptographic hash collision, which is when two messages produce a same hash value. Additionally, cryptographic functions employed herein may have various other properties.

Combine hash value instructions 122, when executed by processor 110, may combine the hash values into a combined value. For example, hash values 421-429 may be combined into combined value 430. A combined value may be an intermediate value representing a combination of hash values.

In some examples, hash values may be combined by concatenation. For example, hash values 421-429 may be concatenated together in sequence as simple strings to form a combined value that includes all of the hash values. Alternatively or in addition, hash values may be combined by matrix multiplication. Details of these methods of combining hash values is described in detail herein, in relation to FIGS. 2A, 2B, and 3. Furthermore, hash values may be combined by other available methods.

In some examples, the combined value of the hash values may retain the same sequence as the sequence of data blocks. This allows for the operation to combine the hash values to be non-commutative. A non-commutative operation is one which produces different results when the inputs are in a different order. For example, an operation θ is non-commutative when for some x, y: (x θ y)≠(y θ x).

Accordingly, to produce a correct combined hash, the sequence of hash values in the combined value should retain the sequence of the data blocks.

Furthermore in some examples, the operation to combine the hash values may be associative. An associative operation is one in which the order of operation may not matter in obtaining the same result. For example, an operation θ is associative when for x, y, and z: x θ (y θ z)=(x θ y) θ z. As a result, a combining operation, such as concatenation may occur in multiple steps. For example, as illustrated in FIG. 4A, hash value 421 and hash value 422 may be combined into combined value 432. Each hash value 423-427 may then be sequentially combined into the combined value. However due to associativity, hash value 428 and hash value 429 may first be combined into combined value 439 before being combined into the overall combined value to form combined value 430.

Continuing to refer to FIG. 1, instructions 123, when executed by processor 110, may calculate a master hash value for the combined value. For example, a master hash value 440 may be calculated for combined value 430, which is a combination of the hash values 421-429 of data blocks 411-419. The master hash is a representation of all of the data blocks. For example, changing a data block or its position may cause changes to the resulting master hash. Various hash functions may be employed to calculate the master hash. For example, the same or different hash function as that executed in instructions 121 may be utilized, such as a cryptographic hash function.

Figure 2A:
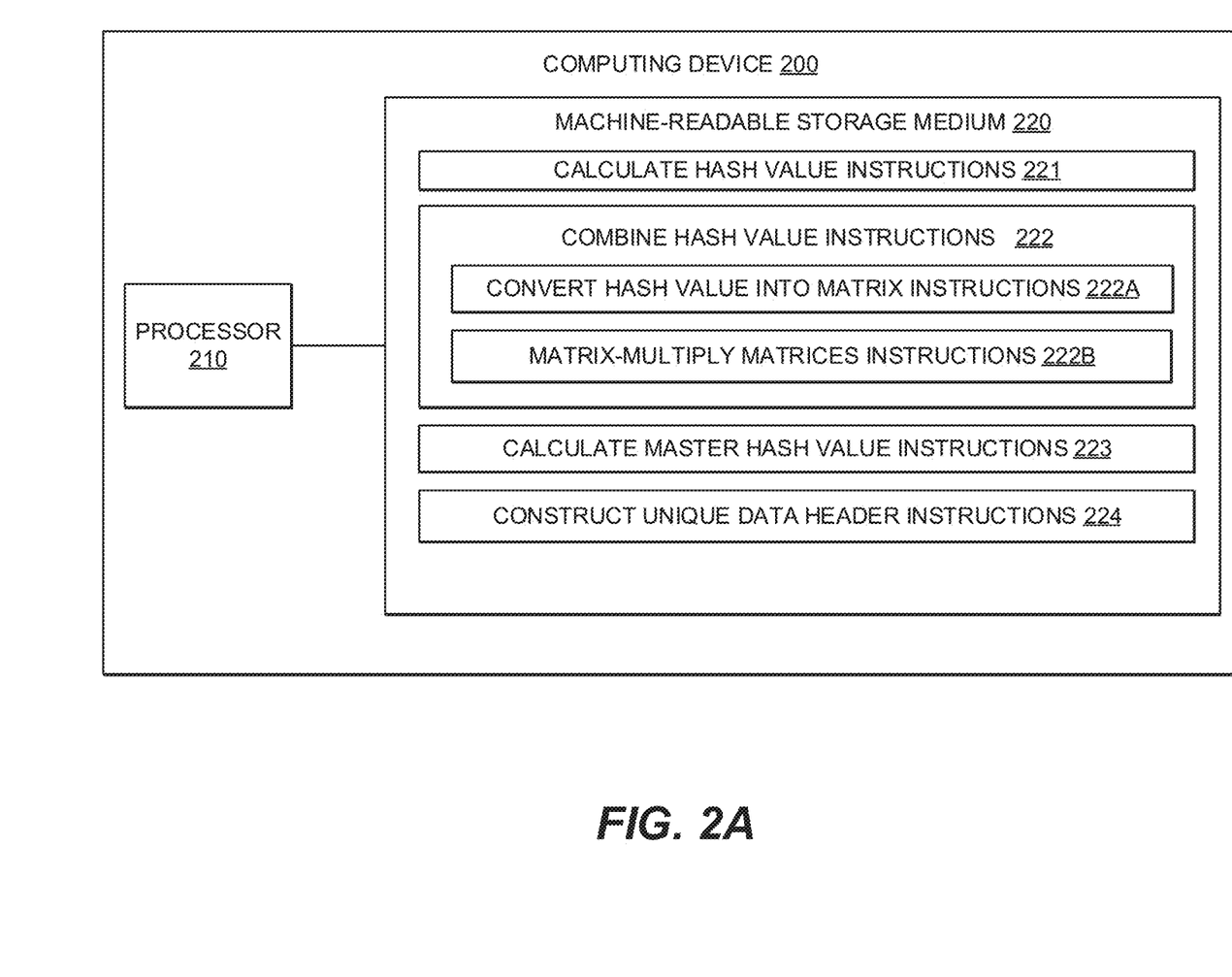
FIG. 2A is a block diagram of an example computing device for combining hashes of data blocks by matrix-multiplication.

FIG. 2A depicts an example computing device 200 for combining hashes of data blocks by matrix-multiplication. Similar to computing device 100, computing device 200 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. In the example shown in FIG. 2A, computing device 200 includes a processor 210 and a non-transitory machine-readable storage medium 220 encoded with instructions to combine hash values of data blocks.

Processor 210 may be one or more central processing units (CPUs), semiconductor-based microprocessors, and/or other hardware devices suitable for retrieval and execution of instructions stored in machine-readable storage medium 220. Processor 220 may fetch, decode, and execute instructions 221, 222, 223, 224, and/or other instructions to implement the procedures described herein.

Calculate hash value instructions 221, when executed by processor 210, may calculate a hash value for each data block in a sequence of data blocks. The operation of computing device 200 may be illustrated in FIG. 4A and FIG. 4B, which will be correlatively described with FIGS. 2A, 2B, and 2C. For example, hash values 421-429 may be calculated for data blocks 411-419 using a hash function, such as a cryptographic hash function.

Combine hash value instructions 222, when executed by processor 210, may combine the hash values into a combined value. For example, hash values 421-429 may be combined into combined value 430. In some examples, hash values may be combined by matrix-multiplication, as described herein with FIGS. 2A and 2B. Combine hash value instructions 222 may include convert hash value into matrix instructions 222A and matrix-multiply matrices instructions 222B.

Figure 2B:
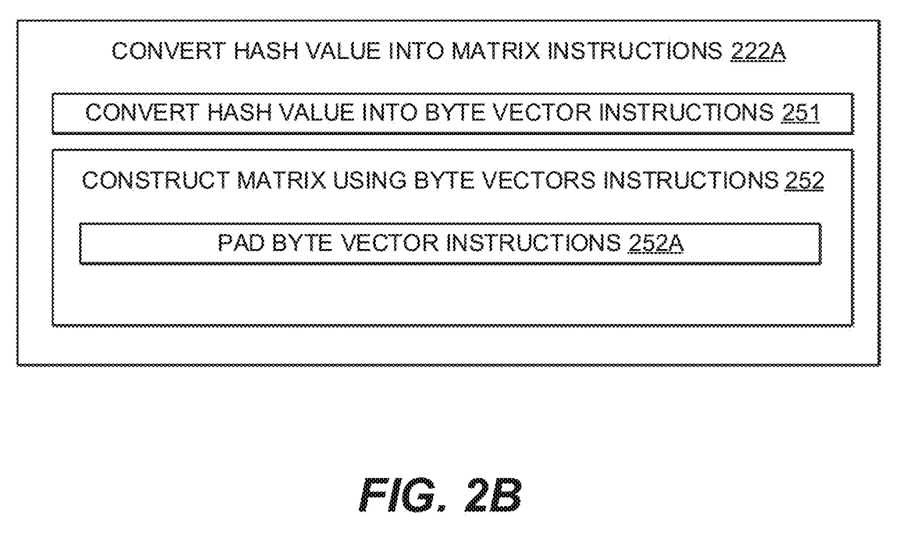
FIG. 2B is a block diagram of an example non-transitory machine-readable storage medium having instructions to combine a hash value into a matrix.
Figure 4B:
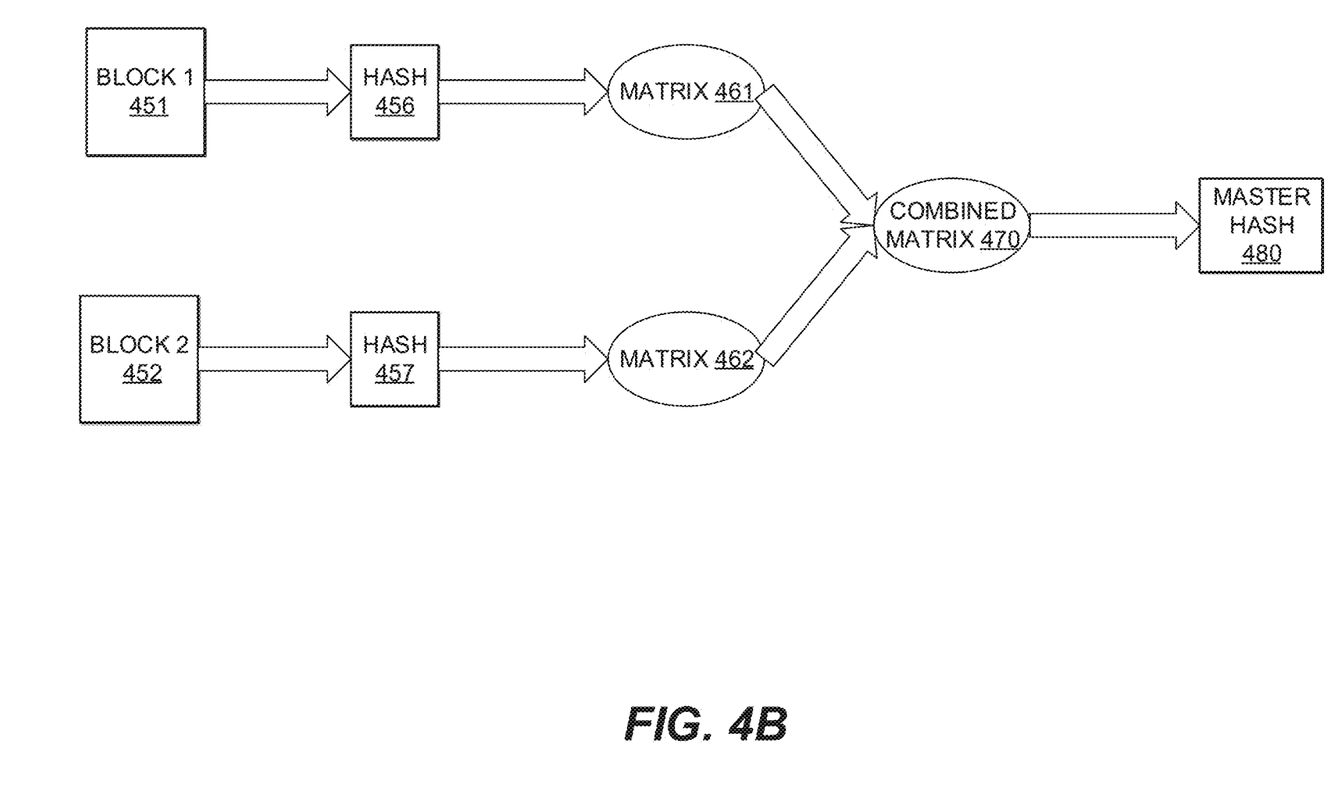
FIG. 4B is a schematic flowchart of an example process of combing hashes by matrix multiplication.

Convert hash value into matrix instructions 222A, when executed by processor 210, may convert a hash value into at least one matrix. For example, each hash value 421-429 may be converted into at least one matrix to form a plurality of matrices. This is illustrated in FIG. 4B, where hash value 451 may be converted into matrix 461, and hash value 452 may be converted into matrix 462. Convert hash value into matrix instructions 222A may itself include various operations, which are represented in FIG. 2B. For example, convert hash value into matrix instructions 222A may include convert hash value into byte vector instructions 251 and construct matrix using byte vector instructions 252.

Figure 6:
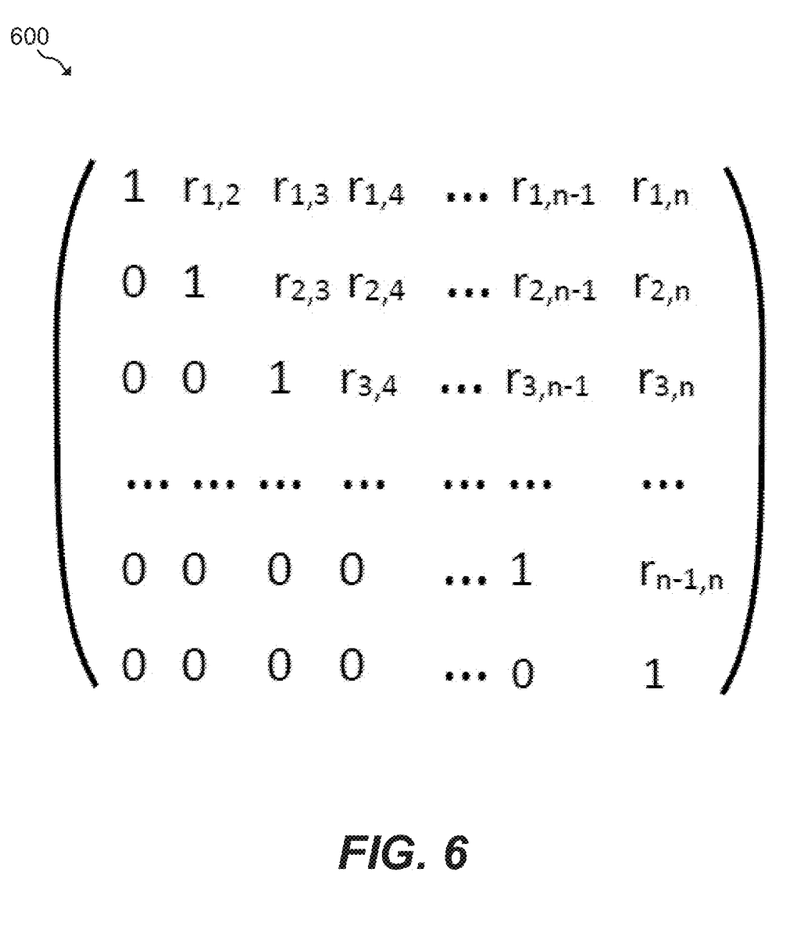
FIG. 6 is a schematic diagram of an example M(r, n) matrix.

An important property of the conversion operation from hash to matrix is that it is reversible. Accordingly, the combined matrix may be converted back into a combined hash. Thus, the mapping of hash values into matrices may involve a particular class of matrices in a structural pattern such that it can be projected back into hash values. For example, a matrix with lower triangular 0 entries, leading diagonal 1, and integer elements in the upper triangular. Matrices of this kind are called M(n, r) where n is the number of dimensions (rows, columns), and r specifies the class of entries as (integers modulo r). For example, matrices from M(n, 256) may be utilized in examples herein. Matrix 600 of FIG. 6 illustrates a matrix M(n, r).

Convert hash value into byte vector instructions 251, when executed by processor 210, may convert a hash value into a byte vector. Specifically, a hash value may be converted into a sequence of bytes. These bytes may then be used to fill-in entries to construct a matrix in M(n,256) for some appropriate row size n. This may be performed deterministically in various ways. Entries in the upper triangular region of the matrix would therefore correspond to particular byte values from the byte vector.

However, the number of fillable entries in any matrix in M(n, k) is necessarily the (n−1)st triangular number, T(n−1), where T(n)=n(n+1)/2, the number of places in the upper triangle. Hash values may have different lengths and thus some convention may be adopted so that each byte of the hash value contributes directly to an entry in the particular matrix being defined. Multiple procedures may be taken to rectify this issue, including but not limited to padding the byte vector and/or decomposing the byte vector to multiple matrices.

Pad byte vector instructions 252A, when executed by processor 210, may pad the vector to an appropriate length. For example, the byte vector may be padded deterministically so that it contains an appropriate triangular number of bytes, one for each entry in the desired matrix. Numerous padding methods may be employed. In an example, zero values may be added to the byte vector to fill out the remaining spaces in the matrix.

Figure 2C:
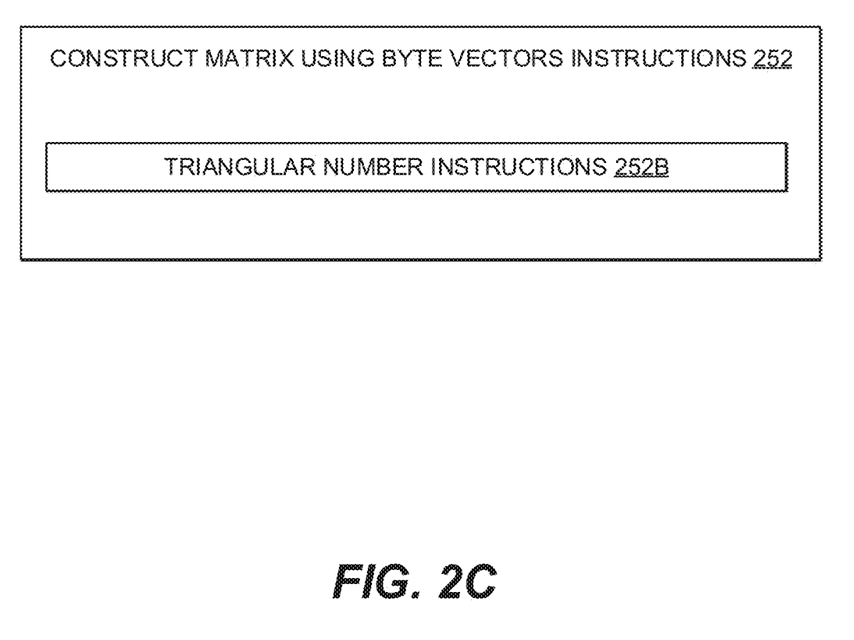
FIG. 2C is a block diagram of an example non-transitory machine-readable storage medium having instructions to combine a hash value into a matrix utilizing triangular numbers.

Alternatively, triangular number instructions 252B, when executed by processor 210, may construct at most three matrices for each hash value using the byte vectors. The technique employed in triangular number instructions 252B exploits Gauss's Triangular Number Theorem, which states that each nonnegative integer can be expressed as sum of at most three triangular numbers. Accordingly, a byte vector of a hash value may be decomposed into a sum of one to three triangular numbers. The entries of the byte vector may then be mapped into the one to three matrices with corresponding size. Although this technique produces up to three matrices per hash values, these matrices may nonetheless be used independently to combine hash values that have also been decomposed in the same manner.

Once the hash values have been converted into matrices, matrix-multiply matrices instructions 222B, when executed by processor 210, may matrix-multiply the matrices to construct a combined value. For example, matrix 461 and matrix 462 may be matrix-multiplied to construct combined matrix 470. Combined matrix 470 may represent the final matrix after matrix-multiplication of all matrices of the hash values 421-429.

Once a combined matrix has been constructed, calculate master hash value instructions 223, when executed by processor 210, may calculate a master hash value for the combined matrix value. For example, a master hash value 480 may be calculated for combined matrix 470, which is a combination of the hash values 421-429 of data blocks 411-419. The master hash is a representation of all of the data blocks. In some examples, a combined byte vector may be extracted from the combined matrix. This may be done by mapping the combined byte vector elements with certain entries in the combined matrix. This extracted combined byte vector may then be used as the master hash value, or an additional hash function may be performed on the combined byte vector to calculate the master hash value.

Furthermore, because hash values of data blocks are converted to and from matrices, if any data blocks are equal to other data blocks, then their corresponding hashes may also be equal. Consequently, their resulting matrices may be equal as well. Therefore, construct unique data header instructions 224, when executed by processor 210, may construct a unique data header for each data block 411-419. Each unique data header may have a unique identifying value (UID) that is different for each block. Generally each UID may be not have any reference to the data block's content. This header may be hashed together with the data block's content to obtain a single unique hash value.

In some examples, the data header may either be embedded inside each corresponding data block or, alternatively, communicated separately in the form of additional corresponding metadata. In the former instances, post-processing may be performed to remove the embedded data header from data block to obtain the original data content.

Furthermore, another solution to this challenge is to naturally provide unique data blocks. For example, the data may be partitioned into numbered data blocks, such as done for networking packets, to ensure that each data block has hash uniqueness.

Figure 3:
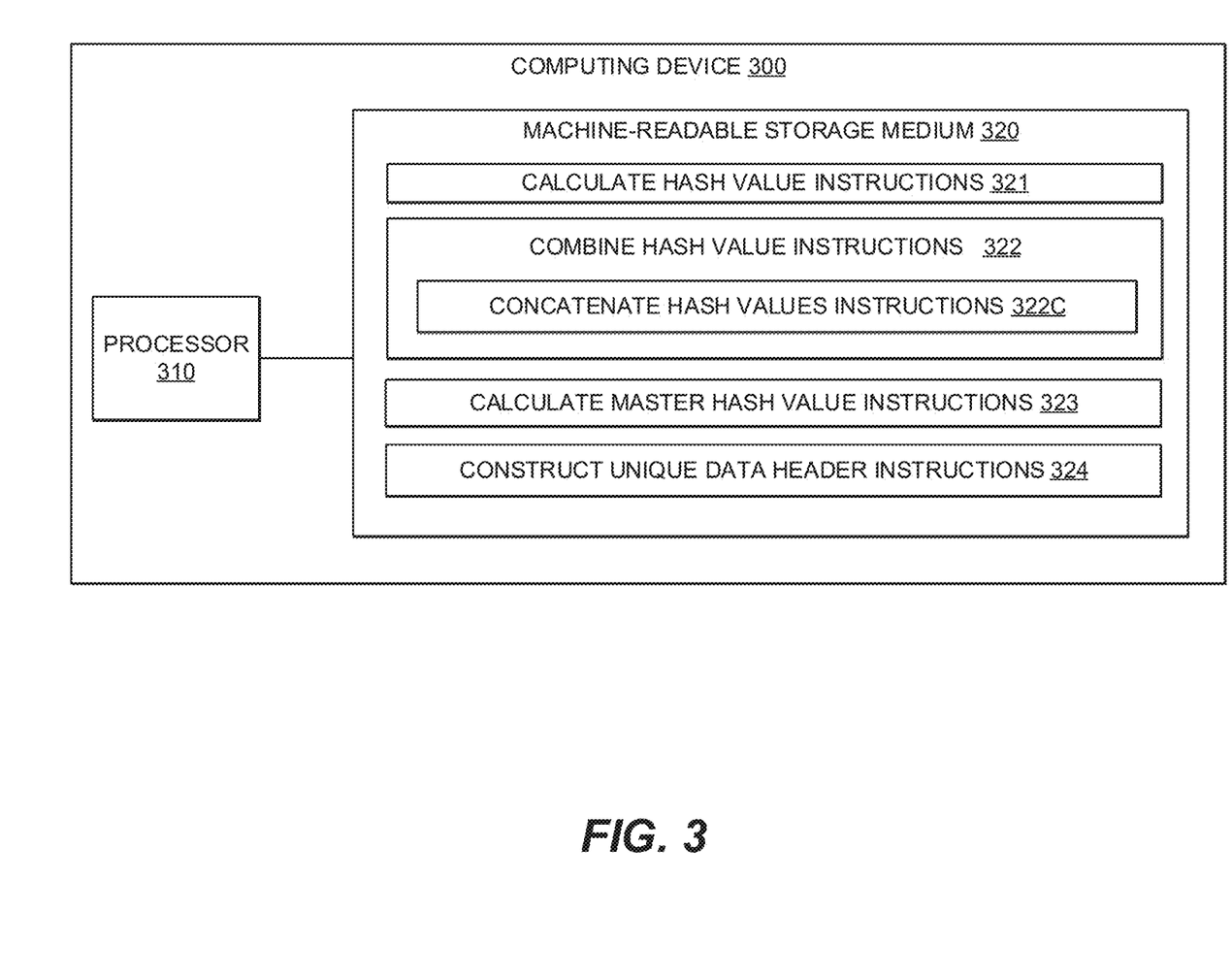
FIG. 3 is a block diagram of an example computing device for combing hashes of data blocks by string concatenation.

FIG. 3 depicts an example computing device 300 for combing hashes of data blocks by string concatenation. Similar to computing devices 100 and 200, computing device 300 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. In the example shown in FIG. 3, computing device 300 includes a processor 310 and a non-transitory machine-readable storage medium 320 encoded with instructions to combine hash values of data blocks.

Processor 310 may be one or more central processing units (CPUs), semiconductor-based microprocessors, and/or other hardware devices suitable for retrieval and execution of instructions stored in machine-readable storage medium 320. Processor 320 may fetch, decode, and execute instructions 321, 322, 323, 324, and/or other instructions to implement the procedures described herein.

As described herein with relation to FIGS. 1 and 2A, calculate hash value instructions 321, when executed by processor 310, may calculate a hash value for each data block in a sequence of data blocks. For example, hash values 421-429 of FIG. 4A may be calculated for data blocks 411-419 using a hash function, such as a cryptographic hash function.

Combine hash value instructions 322, when executed by processor 310, may combine the hash values into a combined value. For example, hash values 421-429 may be combined into combined value 430. In some examples, hash values may be combined by concatenation. Combine hash value instructions 322 may include concatenate hash values instructions 322C.

Concatenate hash values instructions 322C, when executed by processor 510, may concatenate the hash values into a hash-string. In some examples, a hash value of a data block may be calculated as it arrives, and then the hash value is inserted into an overall hash-string in the corresponding location in the string. Thus, each hash value for each block has a corresponding position in the overall hash-string.

Furthermore, because the hash values are independently calculated, segments of partial hashes may be separately computed and then concatenated together later. As long as each segment is positioned correctly relative to the other segments, the order of concatenation may not affect the operation due to associativity. For example, as illustrated in FIG. 4A, combined hash value 439 may be calculated by concatenating hash values 428 and 429 before it is concatenated to the overall hash-string. However, the order of the data blocks is retained because the operation is non-commutative. In other words, changing the position of the hash in the sequence of the blocks may cause changes to the resulting hash-string.

Once the hash-string has been constructed, calculate master hash value instructions 323, when executed by processor 310, may calculate a master hash value for the hash-string. For example, a master hash value 440 may be calculated for combined value 430, which is the hash-string. The master hash is a representation of all of the data blocks.

Furthermore, construct unique data header instructions 324, when executed by processor 310, may construct a unique data header for each data block 411-419. Each unique data header may have a unique identifying value (UID) that is different for each block. Generally each UID may be not have any reference to the data block's content. This header may be hashed together with the data block's content to obtain a single unique hash value.

In some examples, the data header may either be embedded inside each corresponding data block or, alternatively, communicated separately in the form of additional corresponding metadata. In the former instances, post-processing may be performed to remove the embedded data header from data block to obtain the original data content.

Furthermore, another solution to this challenge is to naturally provide unique data blocks. For example, the data may be partitioned into numbered data blocks, such as done for networking packets, to ensure that each data block has hash uniqueness.

Figure 5:
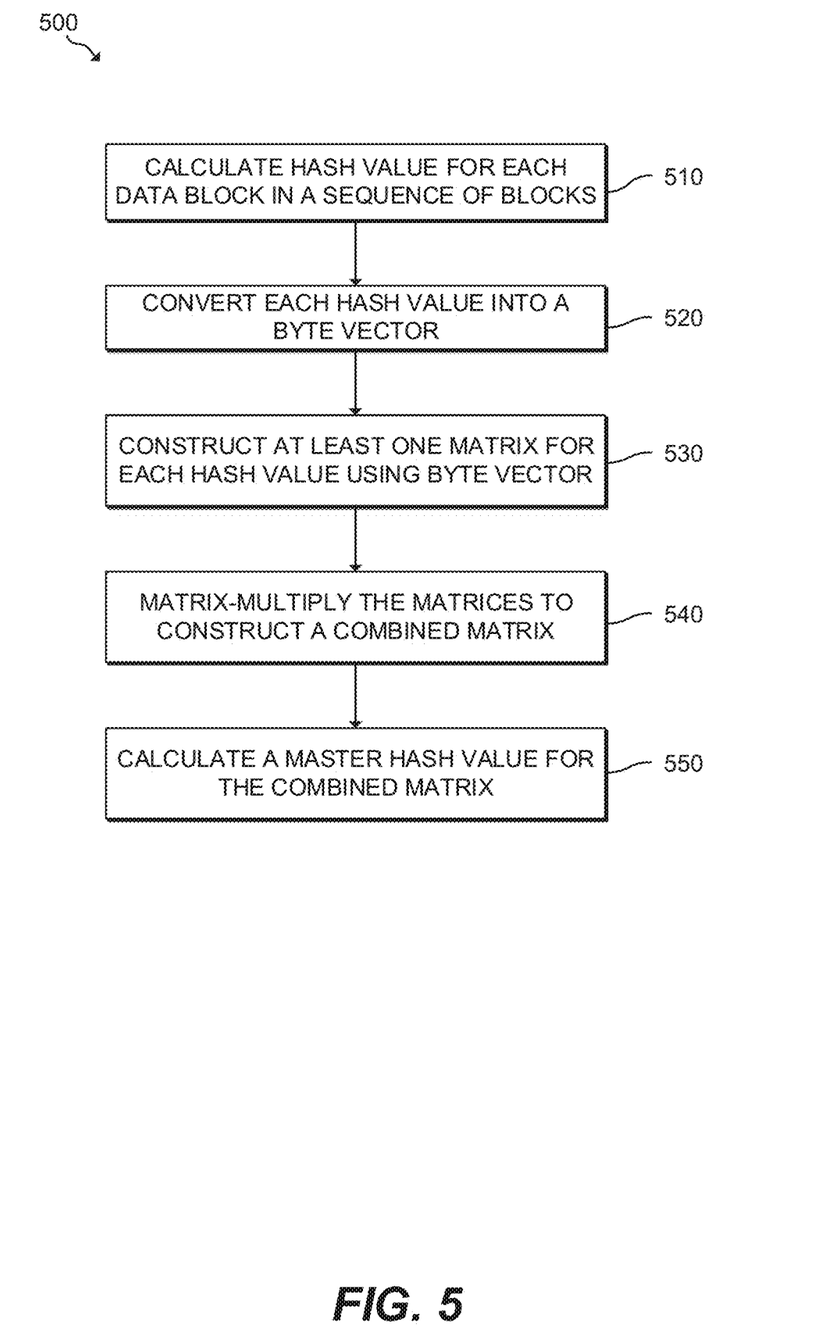
FIG. 5 is a flowchart of an example method for combining hashes of data blocks.

FIG. 5 depicts an example method 500 for combining hashes of data blocks. Although execution of method 500 is described below with reference to the examples illustrated in FIGS. 2A, 2B, 4A, and 4B, other suitable devices for execution of this method should be apparent, including the examples of FIG. 1 and FIG. 3. Method 500 may be implemented in the form of executable instructions stored on a machine-readable storage medium and/or in the form of electronic circuitry.

In an operation 510, a hash value may be calculated for each data block in a sequence of data blocks. For example, computing device 200 may calculate a hash value 421-429 for a sequence of data blocks 411-419, respectively. Various hash functions may be performed on data blocks 411-419 to obtain hash values 421-429.

In some examples, hash values 421-429 may be calculated from data blocks 411-419, respectively, by the operation of a cryptographic hash function. Cryptographic hash functions may be hash functions that are practically impossible to invert, that is, to recreate the input data from its hash value alone. Cryptographic hash functions may be able to withstand cryptanalytic attack. A cryptographic hash function may have several properties, including pre-image resistance, second pre-image resistance, and collision resistance. Various cryptographic functions may be employed in the examples herein. Specific, non-limiting, examples include SHA-2 and SHA-3.

In an operation 520, each hash value may be converted into a byte vector. For example, a hash value may be converted into a sequence of bytes. These bytes may then be used to fill-in entries to construct a matrix in M(n,256) for some appropriate matrix size n. This may be performed deterministically in various ways. Entries in the matrix would therefore correspond to particular byte values from the byte vector.

In an operation 530, at least one matrix may be constructed for each hash value using the byte vectors. For example, the values of the byte vector may be mapped into entries in the matrix.

However, the number of fillable entries in any matrix in M(n, k) is necessarily the $(n-1)^{th}$ triangular number. Hash values may have different lengths and thus some convention may be adopted so that each byte of the hash value contributes directly to the particular matrix being defined. Multiple procedures may be taken to rectify this issue, including but not limited to padding the byte vector and/or decomposing the byte vector to multiple matrices. Alternatively, the byte vector may be decomposed into one to three triangular numbers that sum to be the length of the byte vector. These triangular numbers may then determine portions of the byte vector, which each may be mapped into a separate matrix. As a result, each byte vector may be mapped into one to three matrices.

In an operation 540, the matrices are matrix-multiplied to construct a combined matrix. For example, matrix 461 and matrix 462 of FIG. 4B may be matrix-multiplied to construct combined matrix 470. Combined matrix 470 may represent the final matrix after matrix-multiplication of all matrixes of the hash values 421-429.

In an operation 550, a master hash value may be calculated for the combined matrix. For example, a master hash value 480 may be calculated for combined matrix 470, which is a combination of the hash values 421-429 of data blocks 411-419. The master hash is a representation of all of the data blocks. In some examples, a combined byte vector may be extracted from the combined matrix. This may be done by mapping the combined byte vector elements with certain entries in the combined matrix. This extracted combined byte vector may then be used as the master hash value, or an additional hash function may be performed on the combined byte vector to calculate the master hash value.

As an alternative to the matrix-multiplication processes described in relation to FIG. 5, hash values of data blocks may be combined by sequentially concatenating hash values into a hash-string. Details of examples of such operations are described above in relation to FIG. 3.

Figure 7:
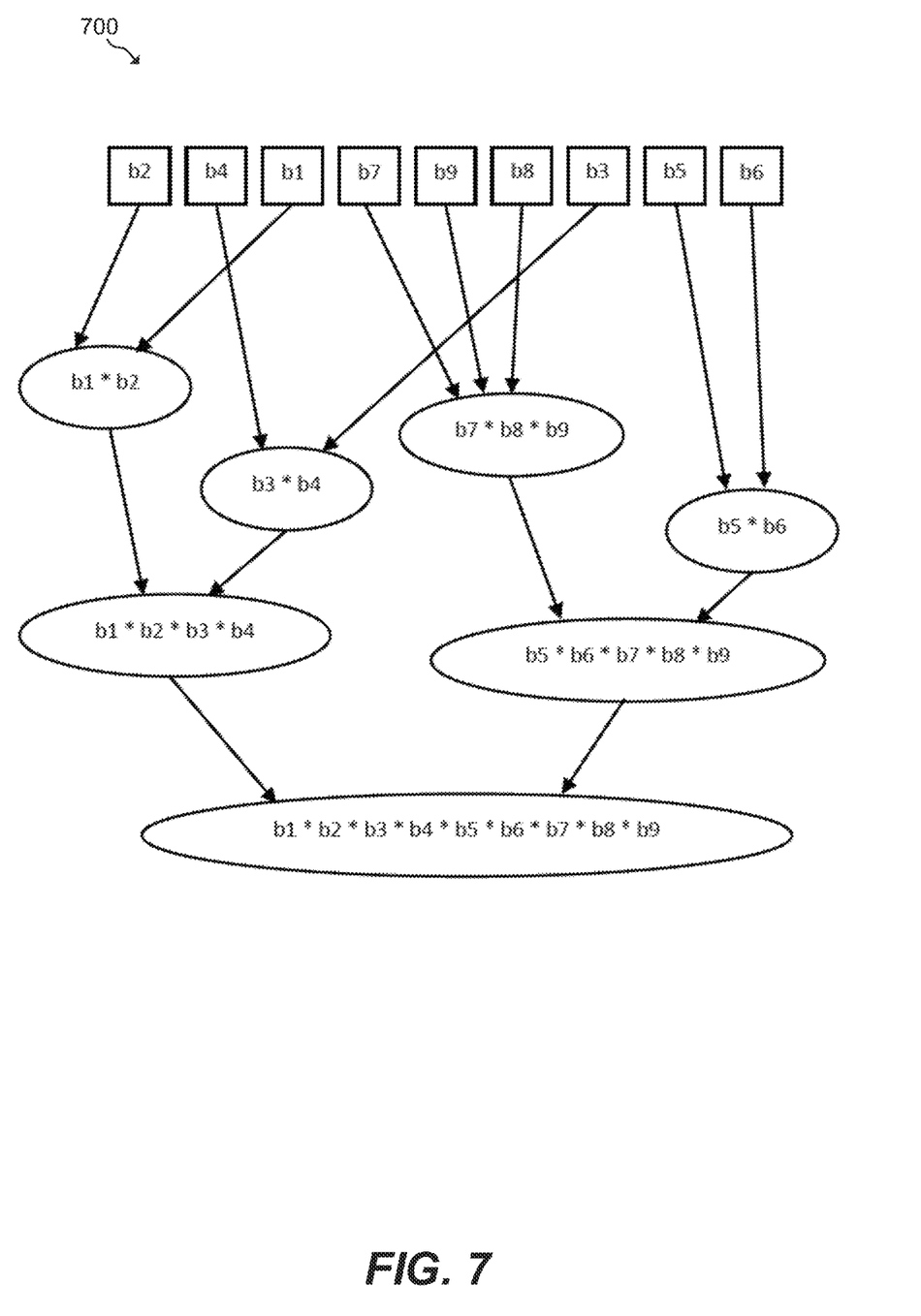
FIG. 7 is a schematic flowchart of an example hashing process showing combining hashes of data blocks.

FIG. 7 illustrates an example combining of hashes as taught herein. FIG. 7 shows a plurality of hash values, shown as b1 to b9, of a sequence of data blocks. Hash values b1-b9 may include identifying information, such as unique headers, that identify the respective data block's position within a sequence. In the example shown in FIG. 7, hash values b1-b9 may not be in numerical order when processed. The processes taught herein allow for hashing of the data blocks by combining partial hashes of a subset of the data blocks.

For example, due to the associative properties of the functions herein, hashes may be combined in any order as long as the sequence of the hashes reflect the sequence of the data blocks. For example, b1 may be combined with b2, b3 may be combined with b4, and then the two intermediate hash values may be combined. Hashes may be combined as soon as a subsequent hash is processed in the correct order. Thus, examples herein provide for flexible and efficient combining of hashes of data blocks.

The foregoing disclosure describes a number of example embodiments for combining hashes of data blocks. The disclosed examples may include systems, devices, computer-readable storage media, and methods for combining hash values. For purposes of explanation, certain examples are described with reference to the components illustrated in FIGS. 1-7. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A non-transitory machine-readable storage medium encoded with instructions executable by a processor of a computing device, the non-transitory machine-readable storage medium comprising instructions to:
   calculate a hash value for each data block in a sequence of data blocks, to produce a plurality of hash values for the data blocks of the sequence of data blocks;
   combine, using a combination function that is both associative and non-commutative, the plurality of hash values into a combined value, wherein the plurality of hash values combined into the combined value has a same sequence as the sequence of data blocks; and
   calculate a master hash value based on the combined value, the master hash value representing the data blocks of the sequence of data blocks and for use in a computer security operation.

2. The non-transitory machine-readable storage medium of claim 1, further comprising instructions to construct a unique data header for each data block of the sequence of data blocks,
   wherein the instructions to calculate the hash value for each data block in the sequence of data blocks uses the unique data header for the data block.

3. The non-transitory machine-readable storage medium of claim 2, wherein the unique data header comprises a unique identifying value.

4. The non-transitory machine-readable storage medium of claim 2, wherein the unique data header comprises a sequence number.

5. The non-transitory machine-readable storage medium of claim 1, wherein the instructions to combine the plurality of hash values into the combined value comprise instructions to:
   convert each respective hash value of the plurality of hash values into at least one matrix to create a plurality of matrices; and
   matrix-multiply the matrices of the plurality of matrices to construct a combined matrix, wherein the combined value is the combined matrix, and the combination function performs the matrix-multiplying.

6. The non-transitory machine-readable storage medium of claim 5, wherein the instructions to convert each respective hash value of the plurality of hash values into the at least one matrix comprises instructions to:
   convert the respective hash value into a byte vector; and
   construct the at least one matrix for the respective hash value using the byte vector.

7. The non-transitory machine-readable storage medium of claim 6, further comprising instructions to pad the byte vector to a target length.

8. The non-transitory machine-readable storage medium of claim 6, further comprising instructions to:
   decompose a length of the byte vector into a sum of at most three triangular numbers;
   construct at most three matrices for the respective hash value using the byte vector, wherein sizes of the at most three matrices correspond to the triangular numbers.

9. The non-transitory machine-readable storage medium of claim 5, wherein a property of the converting of the respective hash value into the at least one matrix is that the converting is reversible.

10. The non-transitory machine-readable storage medium of claim 1, wherein the instructions to combine the plurality of hash values comprises instructions to string concatenate the plurality of hash values into a hash-string, wherein the combined value is the hash-string, and the combination function performs the string concatenating.

11. The non-transitory machine-readable storage medium of claim 10, wherein the instructions to string concatenate the plurality of hash values into the hash-string comprise instructions to string concatenate a given hash value of the plurality of hash values into an intermediate hash-string that includes a concatenation of other hash values of the plurality of hash values.

12. A computing device comprising:
   a processor; and
   a non-transitory storage medium storing instructions executable on the processor to:
      calculate a hash value for each data block in a sequence of data blocks, to produce a plurality of hash values for the data blocks of the sequence of data blocks;
      perform a string concatenation of the plurality of hash values to produce a combined value, wherein the plurality of hash values combined into the combined value has a same sequence as the sequence of data blocks; and calculate a master hash value based on the combined value, the master hash value representing the data blocks of the sequence of data blocks and for use in a computer security operation.

13. The computing device of claim 12, wherein the sting concatenation is both associative and non-commutative.

14. The computing device of claim 12, wherein the combined value is a hash-string, and wherein the instructions are executable on the processor to:

produce the hash-string by concatenating a given hash value of the plurality of hash values into an intermediate hash-string that includes a concatenation of other hash values of the plurality of hash values.

15. A method performed by a computing device, the method comprising:

calculating a hash value for each data block in a sequence of data blocks, to produce a plurality of hash values for the data blocks of the sequence of data blocks;

converting each hash value of the plurality of hash values into a respective byte vector;

constructing at least one matrix for each hash value of the plurality of hash values using the respective byte vector, to produce matrices for the plurality of hash values;

matrix-multiplying the matrices to construct a combined matrix;

converting the combined matrix into a combined value; and calculating a master hash value for the combined value, the master hash value representing the data blocks of the sequence of data blocks and for use in a computer security operation.

16. The method of claim 15, further comprising padding the respective byte vector for each hash value of the plurality of hash values to a target length.

17. The method of claim 15, further comprising decomposing a length of the respective byte vector into a sum of at most three triangular numbers, wherein the at least one matrix is at most three matrices, and wherein sizes of the at most three matrices correspond to the triangular numbers.

18. The method of claim 15, further comprising concatenating the plurality of hash values into a hash-string, and calculating the master hash value for the hash-string.

19. The method of claim 15, wherein the matrix-multiplying is both associative and non-commutative.

20. The method of claim 15, further comprising:

constructing a unique data header for each data block of the sequence of data blocks, wherein the calculating of the hash value for each data block in the sequence of data blocks uses the unique data header for the data block.

21. The method of claim 20, wherein the unique data header comprises a unique identifying value.

22. The method of claim 20, wherein the unique data header comprises a sequence number.

* * * * *